United States Patent
White et al.

(10) Patent No.: US 8,042,054 B2
(45) Date of Patent: Oct. 18, 2011

(54) SYSTEM FOR MANAGING MEDIA CONTENT

(75) Inventors: Scott White, Austin, TX (US); James Cansler, Pflugerville, TX (US); Ankur Mukerji, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 840 days.

(21) Appl. No.: 11/972,490

(22) Filed: Jan. 10, 2008

(65) Prior Publication Data

US 2009/0183222 A1 Jul. 16, 2009

(51) Int. Cl.
*G06F 3/14* (2006.01)
*G06F 17/60* (2006.01)

(52) U.S. Cl. ........ 715/762; 715/763; 715/765; 715/766; 715/767; 715/768; 725/132

(58) Field of Classification Search .......... 715/200–277, 715/700–867, 999.107; 700/701–866; 709/201–229; 705/50–79; 345/30–111; 707/1–10, 100–104.1, 200–206, 14
See application file for complete search history.

(56) References Cited

U.S. PATENT DOCUMENTS

| | | | |
|---|---|---|---|
| 7,398,261 B2 * | 7/2008 | Spivack et al. | 706/55 |
| 7,584,208 B2 * | 9/2009 | Spivack et al. | 1/1 |
| 7,640,267 B2 * | 12/2009 | Spivack et al. | 1/1 |
| 7,672,909 B2 * | 3/2010 | Meijer et al. | 706/12 |
| 7,716,150 B2 * | 5/2010 | Cheng et al. | 706/45 |
| 7,769,794 B2 * | 8/2010 | Moore et al. | 707/831 |
| 2005/0198299 A1 * | 9/2005 | Beck et al. | 709/226 |
| 2006/0155724 A1 * | 7/2006 | Lee et al. | 707/100 |
| 2006/0287916 A1 * | 12/2006 | Starr et al. | 705/14 |
| 2008/0195664 A1 * | 8/2008 | Maharajh et al. | 707/104.1 |
| 2010/0070448 A1 * | 3/2010 | Omoigui | 706/47 |

FOREIGN PATENT DOCUMENTS

JP 62025345 2/1987

OTHER PUBLICATIONS

Windows, "Windows Volume Labeling", 2 pages, ms-its:C:\WINDOWS\Help\ntcmds.chm::/label.htm, website last visited Dec. 7, 2007.

* cited by examiner

*Primary Examiner* — Ruay Ho
(74) *Attorney, Agent, or Firm* — Andrew Gust; Guntin Meles & Gust, PLC

(57) ABSTRACT

A system that incorporates teachings of the present disclosure may include, for example, a device having a controller to create metadata corresponding to an identity of an entity, incorporate in a media file the metadata that identifies the entity with metadata that describes media content in the media file, and present a graphical user interface depicting a media file directory structure generated according to the metadata that identifies the entity and the metadata that describes media content in the media file. Other embodiments are disclosed.

20 Claims, 9 Drawing Sheets

100

200

500

SYSTEM FOR MANAGING MEDIA CONTENT

FIELD OF THE DISCLOSURE

The present disclosure relates generally to media content presentation techniques and more specifically to a system for managing media content.

BACKGROUND

Multiple users within a household can have different but overlapping tastes in media content (music, photos, videos, etc.). Often such users share a common media library stored in a shared network drive that is organized in directory folders. Leveraging media content via consumption software (e.g., Windows Media Player, Picasso, etc.) generally involves pointing the applications to one or more folders, where they scan for all media files therein.

This is generally a satisfactory method where tastes are exclusive to individuals (e.g., Mom's media is stored in Mom's folder, Dad's media is stored in Dad's folder, and so on). However, when tastes overlap some users create redundant copies of the media in multiple folders, or use an unwieldy method of sub-folders to reduce redundancy (a folder for storing media files used by Mom exclusively, a folder for storing media files shared by Mom and Dad, a folder for storing media files shared by Mom and Johnny, etc.).

DETAILED DESCRIPTION

In one embodiment of the present disclosure, a computer-readable storage medium can have computer instructions for receiving a request to tag at least a portion of a media file with an identity of a user, creating metadata corresponding to the identity of the user, incorporating in the media file the metadata that identifies the user with metadata that describes media content in the media file, and presenting a Graphical User Interface (GUI) depicting a media file directory structure generated according to the metadata that identifies the user and the metadata that describes media content in the media file.

In another embodiment of the present disclosure, a device can have a controller to create metadata corresponding to an identity of an entity, incorporate in a media file the metadata that identifies the entity with metadata that describes media content in the media file, and present a GUI depicting a media file directory structure generated according to the metadata that identifies the entity and the metadata that describes media content in the media file.

In yet another embodiment of the present disclosure, a method can involve associating an identity of an entity with a media file, and presenting a GUI depicting the media file in a media storage system according to the identity of the entity and a description of media content in the media file.

Figure 1:
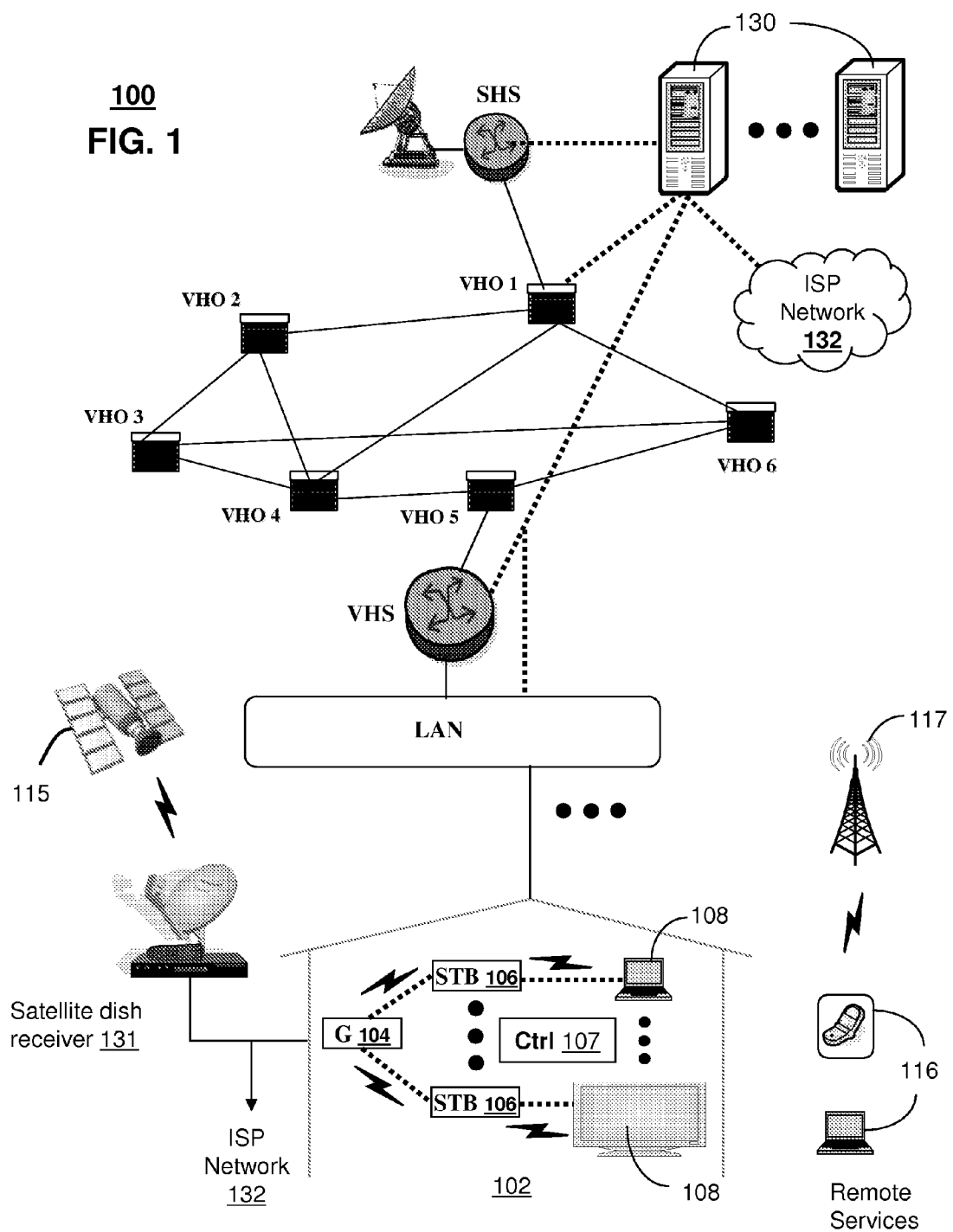
FIGS. 1-4 depict exemplary embodiments of communication systems that provide media services.

FIG. 1 depicts an exemplary embodiment of a first communication system 100 for delivering media content. The communication system 100 can represent an IPTV broadcast media system. In a typical IPTV infrastructure, there is at least one super head-end office server (SHS) which receives national media programs from satellite and/or media servers from service providers of multimedia broadcast channels. In the present context, media programs can represent audio content, moving image content such as videos, still image content, and/or combinations thereof. The SHS server forwards IP packets associated with the media content to video head-end servers (VHS) via a network of aggregation points such as video head-end offices (VHO) according to a common multicast communication method.

The VHS then distributes multimedia broadcast programs via a local area network (LAN) to commercial and/or residential buildings 102 housing a gateway 104 (e.g., a residential gateway or RG). The LAN can represent a bank of digital subscriber line access multiplexers (DSLAMs) located in a central office or a service area interface that provide broadband services over optical links or copper twisted pairs to buildings 102. The gateway 104 distributes broadcast signals to media processors 106 such as Set-Top Boxes (STBs) which in turn present broadcast selections to media devices 108 such as computers or television sets managed in some instances by a media controller 107 (e.g., an infrared or RF remote control). Unicast traffic can also be exchanged between the media processors 106 and subsystems of the IPTV media system for services such as video-on-demand (VoD). It will be appreciated by one of ordinary skill in the art that the media devices 108 and/or portable communication devices 116 shown in FIG. 1 can be an integral part of the media processor 106 and can be communicatively coupled to the gateway 104. In this particular embodiment, an integral device such as described can receive, respond, process and present multicast or unicast media content.

The IPTV media system can be coupled to one or more computing devices 130 a portion of which can operate as a web server for providing portal services over an Internet Service Provider (ISP) network 132 to fixed line media devices 108 or portable communication devices 116 by way of a wireless access point 117 providing Wireless Fidelity or WiFi services, or cellular communication services (e.g., GSM, CDMA, UMTS, WiMAX, etc.).

A satellite broadcast television system can be used in place of the IPTV media system. In this embodiment, signals transmitted by a satellite 115 can be intercepted by a satellite dish receiver 131 coupled to building 102 which conveys media signals to the media processors 106. The media receivers 106 can be equipped with a broadband port to the ISP network 132. Although not shown, the communication system 100 can also be combined or replaced with analog or digital broadcast distributions systems such as cable TV systems.

Figure 2:
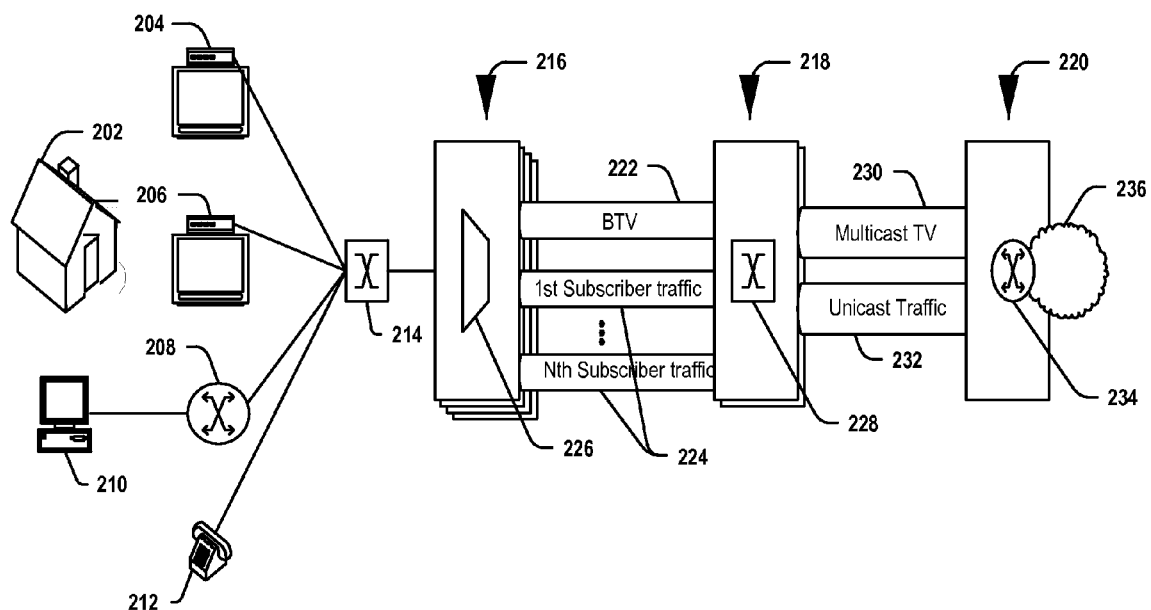

FIG. 2 depicts an exemplary embodiment of a second communication system 200 for delivering media content. Communication system 200 can be overlaid or operably coupled with communication system 100 as another representative embodiment of said communication system. The system 200 includes a distribution switch/router system 228 at a central office 218. The distribution switch/router system 228 receives video data via a multicast television stream 230 from a second distribution switch/router 234 at an intermediate office 220.

The multicast television stream 230 includes Internet Protocol (IP) data packets addressed to a multicast IP address associated with a television channel. The distribution switch/router system 228 can cache data associated with each television channel received from the intermediate office 220.

The distribution switch/router system 228 also receives unicast data traffic from the intermediate office 220 via a unicast traffic stream 232. The unicast traffic stream 232 includes data packets related to devices located at a particular residence, such as the residence 202. For example, the unicast traffic stream 232 can include data traffic related to a digital subscriber line, a telephone line, another data connection, or any combination thereof. To illustrate, the unicast traffic stream 232 can communicate data packets to and from a telephone 212 associated with a subscriber at the residence 202. The telephone 212 can be a Voice over Internet Protocol (VoIP) telephone. To further illustrate, the unicast traffic stream 232 can communicate data packets to and from a personal computer 210 at the residence 202 via one or more data routers 208. In an additional illustration, the unicast traffic stream 232 can communicate data packets to and from a set-top box device, such as the set-top box devices 204, 206. The unicast traffic stream 232 can communicate data packets to and from the devices located at the residence 202 via one or more residential gateways 214 associated with the residence 202.

The distribution switch/router system 228 can send data to one or more access switch/router systems 226. The access switch/router system 226 can include or be included within a service area interface 216. In a particular embodiment, the access switch/router system 226 can include a DSLAM. The access switch/router system 226 can receive data from the distribution switch/router system 228 via a broadcast television (BTV) stream 222 and a plurality of unicast subscriber traffic streams 224. The BTV stream 222 can be used to communicate video data packets associated with a multicast stream.

For example, the BTV stream 222 can include a multicast virtual local area network (VLAN) connection between the distribution switch/router system 228 and the access switch/router system 226. Each of the plurality of subscriber traffic streams 224 can be used to communicate subscriber specific data packets. For example, the first subscriber traffic stream can communicate data related to a first subscriber, and the nth subscriber traffic stream can communicate data related to an nth subscriber. Each subscriber to the system 200 can be associated with a respective subscriber traffic stream 224. The subscriber traffic stream 224 can include a subscriber VLAN connection between the distribution switch/router system 228 and the access switch/router system 226 that is associated with a particular set-top box device 204, 206, a particular residence 202, a particular residential gateway 214, another device associated with a subscriber, or any combination thereof.

In an illustrative embodiment, a set-top box device, such as the set-top box device 204, receives a channel change command from an input device, such as a remoter control device. The channel change command can indicate selection of an IPTV channel. After receiving the channel change command, the set-top box device 204 generates channel selection data that indicates the selection of the IPTV channel. The set-top box device 204 can send the channel selection data to the access switch/router system 226 via the residential gateway 214. The channel selection data can include an Internet Group Management Protocol (IGMP) Join request. In an illustrative embodiment, the access switch/router system 226 can identify whether it is joined to a multicast group associated with the requested channel based on information in the IGMP Join request.

If the access switch/router system 226 is not joined to the multicast group associated with the requested channel, the access switch/router system 226 can generate a multicast stream request. The multicast stream request can be generated by modifying the received channel selection data. In an illustrative embodiment, the access switch/router system 226 can modify an IGMP Join request to produce a proxy IGMP Join request. The access switch/router system 226 can send the multicast stream request to the distribution switch/router system 228 via the BTV stream 222. In response to receiving the multicast stream request, the distribution switch/router system 228 can send a stream associated with the requested channel to the access switch/router system 226 via the BTV stream 222.

Figure 3:
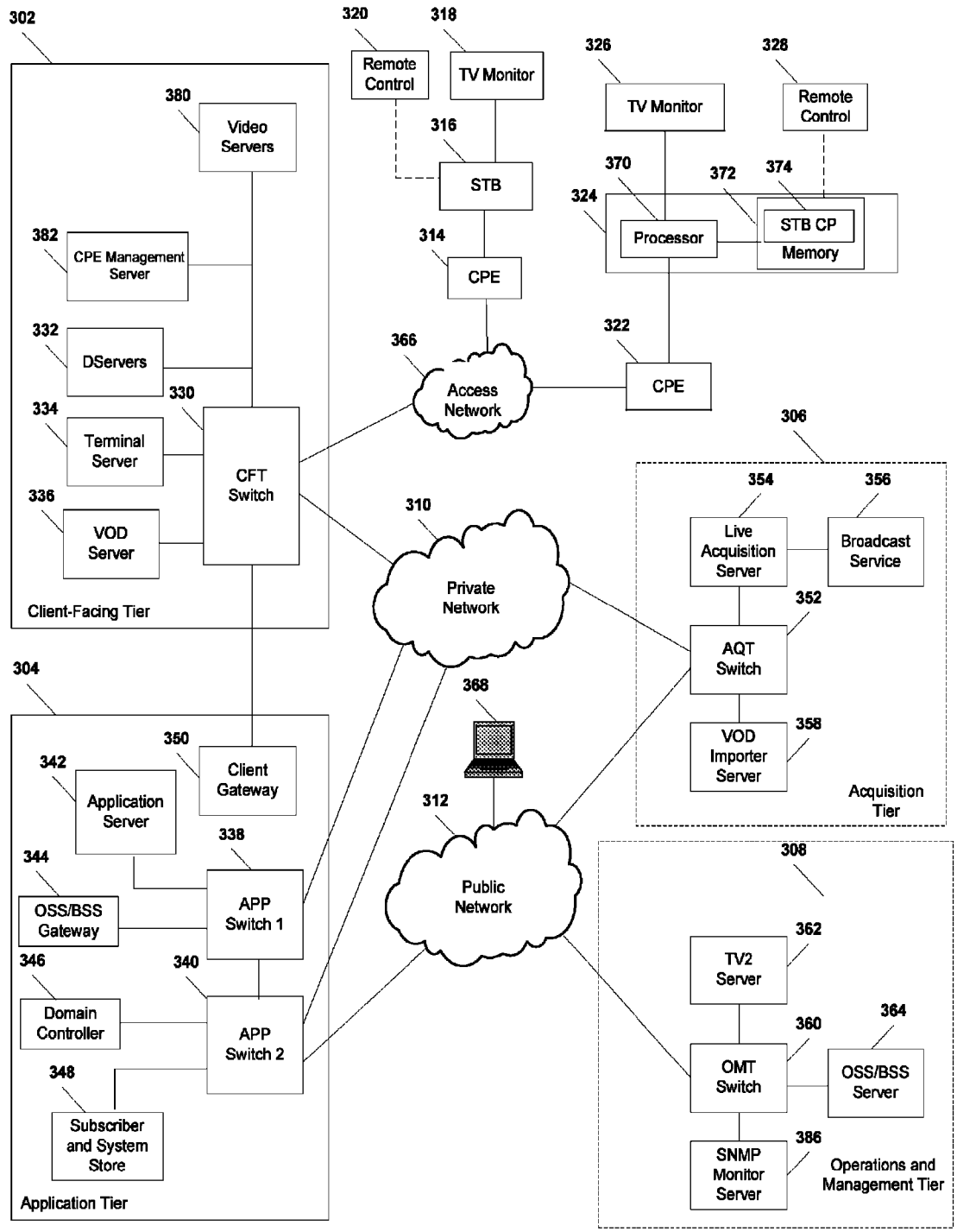

FIG. 3 depicts an exemplary embodiment of a third communication system 300 for delivering media content. Communication system 300 can be overlaid or operably coupled with communication systems 100-200 as another representative embodiment of said communication systems. As shown, the system 300 can include a client facing tier 302, an application tier 304, an acquisition tier 306, and an operations and management tier 308. Each tier 302, 304, 306, 308 is coupled to a private network 310, such as a network of common packet-switched routers and/or switches; to a public network 312, such as the Internet; or to both the private network 310 and the public network 312. For example, the client-facing tier 302 can be coupled to the private network 310. Further, the application tier 304 can be coupled to the private network 310 and to the public network 312. The acquisition tier 306 can also be coupled to the private network 310 and to the public network 312. Additionally, the operations and management tier 308 can be coupled to the public network 322.

As illustrated in FIG. 3, the various tiers 302, 304, 306, 308 communicate with each other via the private network 310 and the public network 312. For instance, the client-facing tier 302 can communicate with the application tier 304 and the acquisition tier 306 via the private network 310. The application tier 304 can communicate with the acquisition tier 306 via the private network 310. Further, the application tier 304 can communicate with the acquisition tier 306 and the operations and management tier 308 via the public network 312. Moreover, the acquisition tier 306 can communicate with the operations and management tier 308 via the public network 312. In a particular embodiment, elements of the application tier 304, including, but not limited to, a client gateway 350, can communicate directly with the client-facing tier 302.

The client-facing tier 302 can communicate with user equipment via an access network 366, such as an IPTV access network. In an illustrative embodiment, customer premises equipment (CPE) 314, 322 can be coupled to a local switch, router, or other device of the access network 366. The client-facing tier 302 can communicate with a first representative set-top box device 316 via the first CPE 314 and with a second representative set-top box device 324 via the second CPE 322. In a particular embodiment, the first representative set-top box device 316 and the first CPE 314 can be located at a first customer premise, and the second representative set-top box device 324 and the second CPE 322 can be located at a second customer premise.

In another particular embodiment, the first representative set-top box device 316 and the second representative set-top box device 324 can be located at a single customer premise, both coupled to one of the CPE 314, 322. The CPE 314, 322 can include routers, local area network devices, modems, such as digital subscriber line (DSL) modems, any other suitable devices for facilitating communication between a set-top box device and the access network 366, or any combination thereof.

In an exemplary embodiment, the client-facing tier 302 can be coupled to the CPE 314, 322 via fiber optic cables. In another exemplary embodiment, the CPE 314, 322 can include DSL modems that are coupled to one or more network nodes via twisted pairs, and the client-facing tier 302 can be coupled to the network nodes via fiber-optic cables. Each set-top box device 316, 324 can process data received via the access network 366, via a common IPTV software platform.

The first set-top box device 316 can be coupled to a first external display device, such as a first television monitor 318, and the second set-top box device 324 can be coupled to a second external display device, such as a second television monitor 326. Moreover, the first set-top box device 316 can communicate with a first remote control 320, and the second set-top box device 324 can communicate with a second remote control 328. The set-top box devices 316, 324 can include IPTV set-top box devices; video gaming devices or consoles that are adapted to receive IPTV content; personal computers or other computing devices that are adapted to emulate set-top box device functionalities; any other device adapted to receive IPTV content and transmit data to an IPTV system via an access network; or any combination thereof.

In an exemplary, non-limiting embodiment, each set-top box device 316, 324 can receive data, video, or any combination thereof, from the client-facing tier 302 via the access network 366 and render or display the data, video, or any combination thereof, at the display device 318, 326 to which it is coupled. In an illustrative embodiment, the set-top box devices 316, 324 can include tuners that receive and decode television programming signals or packet streams for transmission to the display devices 318, 326. Further, the set-top box devices 316, 324 can each include a STB processor 370 and a STB memory device 372 that is accessible to the STB processor 370. In one embodiment, a computer program, such as the STB computer program 374, can be embedded within the STB memory device 372.

In an illustrative embodiment, the client-facing tier 302 can include a client-facing tier (CFT) switch 330 that manages communication between the client-facing tier 302 and the access network 366 and between the client-facing tier 302 and the private network 310. As illustrated, the CFT switch 330 is coupled to one or more distribution servers, such as Distribution-servers (D-servers) 332, that store, format, encode, replicate, or otherwise manipulate or prepare video content for communication from the client-facing tier 302 to the set-top box devices 316, 324. The CFT switch 330 can also be coupled to a terminal server 334 that provides terminal devices with a point of connection to the IPTV system 300 via the client-facing tier 302.

In a particular embodiment, the CFT switch 330 can be coupled to a video-on-demand (VOD) server 336 that stores or provides VOD content imported by the IPTV system 300. Further, the CFT switch 330 is coupled to one or more video servers 380 that receive video content and transmit the content to the set-top boxes 316, 324 via the access network 366. The client-facing tier 302 may include a CPE management server 382 that manages communications to and from the CPE 314 and the CPE 322. For example, the CPE management server 382 may collect performance data associated with the set-top box devices 316, 324 from the CPE 314 or the CPE 322 and forward the collected performance data to a server associated with the operations and management tier 308.

In an illustrative embodiment, the client-facing tier 302 can communicate with a large number of set-top boxes, such as the representative set-top boxes 316, 324, over a wide geographic area, such as a metropolitan area, a viewing area, a statewide area, a regional area, a nationwide area or any other suitable geographic area, market area, or subscriber or customer group that can be supported by networking the client-facing tier 302 to numerous set-top box devices. In a particular embodiment, the CFT switch 330, or any portion thereof, can include a multicast router or switch that communicates with multiple set-top box devices via a multicast-enabled network.

As illustrated in FIG. 3, the application tier 304 can communicate with both the private network 310 and the public network 312. The application tier 304 can include a first application tier (APP) switch 338 and a second APP switch 340. In a particular embodiment, the first APP switch 338 can be coupled to the second APP switch 340. The first APP switch 338 can be coupled to an application server 342 and to an OSS/BSS gateway 344. In a particular embodiment, the application server 342 can provide applications to the set-top box devices 316, 324 via the access network 366, which enable the set-top box devices 316, 324 to provide functions, such as interactive program guides, video gaming, display, messaging, processing of VOD material and other IPTV content, etc. In an illustrative embodiment, the application server 342 can provide location information to the set-top box devices 316, 324. In a particular embodiment, the OSS/BSS gateway 344 includes operation systems and support (OSS) data, as well as billing systems and support (BSS) data. In one embodiment, the OSS/BSS gateway 344 can provide or restrict access to an OSS/BSS server 364 that stores operations and billing systems data.

The second APP switch 340 can be coupled to a domain controller 346 that provides Internet access, for example, to users at their computers 368 via the public network 312. For example, the domain controller 346 can provide remote Internet access to IPTV account information, e-mail, personalized Internet services, or other online services via the public network 312. In addition, the second APP switch 340 can be coupled to a subscriber and system store 348 that includes account information, such as account information that is associated with users who access the IPTV system 300 via the private network 310 or the public network 312. In an illustrative embodiment, the subscriber and system store 348 can store subscriber or customer data and create subscriber or customer profiles that are associated with IP addresses, stock-keeping unit (SKU) numbers, other identifiers, or any combination thereof, of corresponding set-top box devices 316, 324. In another illustrative embodiment, the subscriber and system store can store data associated with capabilities of set-top box devices associated with particular customers.

In a particular embodiment, the application tier 304 can include a client gateway 350 that communicates data directly to the client-facing tier 302. In this embodiment, the client gateway 350 can be coupled directly to the CFT switch 330. The client gateway 350 can provide user access to the private network 310 and the tiers coupled thereto. In an illustrative embodiment, the set-top box devices 316, 324 can access the IPTV system 300 via the access network 366, using information received from the client gateway 350. User devices can access the client gateway 350 via the access network 366, and the client gateway 350 can allow such devices to access the private network 310 once the devices are authenticated or verified. Similarly, the client gateway 350 can prevent unauthorized devices, such as hacker computers or stolen set-top box devices from accessing the private network 310, by denying access to these devices beyond the access network 366.

For example, when the first representative set-top box device 316 accesses the client-facing tier 302 via the access network 366, the client gateway 350 can verify subscriber information by communicating with the subscriber and system store 348 via the private network 310. Further, the client gateway 350 can verify billing information and status by communicating with the OSS/BSS gateway 344 via the private network 310. In one embodiment, the OSS/BSS gateway 344 can transmit a query via the public network 312 to the OSS/BSS server 364. After the client gateway 350 confirms subscriber and/or billing information, the client gateway 350 can allow the set-top box device 316 to access IPTV content and VOD content at the client-facing tier 302. If the client gateway 350 cannot verify subscriber information for the set-top box device 316, e.g., because it is connected to an unauthorized twisted pair, the client gateway 350 can block transmissions to and from the set-top box device 316 beyond the access network 366.

As indicated in FIG. 3, the acquisition tier 306 includes an acquisition tier (AQT) switch 352 that communicates with the private network 310. The AQT switch 352 can also communicate with the operations and management tier 308 via the public network 312. In a particular embodiment, the AQT switch 352 can be coupled to one or more live Acquisition-servers (A-servers) 354 that receive or acquire television content, movie content, advertisement content, other video content, or any combination thereof, from a broadcast service 356, such as a satellite acquisition system or satellite head-end office. In a particular embodiment, the live acquisition server 354 can transmit content to the AQT switch 352, and the AQT switch 352 can transmit the content to the CFT switch 330 via the private network 310.

In an illustrative embodiment, content can be transmitted to the D-servers 332, where it can be encoded, formatted, stored, replicated, or otherwise manipulated and prepared for communication from the video server(s) 380 to the set-top box devices 316, 324. The CFT switch 330 can receive content from the video server(s) 380 and communicate the content to the CPE 314, 322 via the access network 366. The set-top box devices 316, 324 can receive the content via the CPE 314, 322, and can transmit the content to the television monitors 318, 326. In an illustrative embodiment, video or audio portions of the content can be streamed to the set-top box devices 316, 324.

Further, the AQT switch 352 can be coupled to a video-on-demand importer server 358 that receives and stores television or movie content received at the acquisition tier 306 and communicates the stored content to the VOD server 336 at the client-facing tier 302 via the private network 310. Additionally, at the acquisition tier 306, the video-on-demand (VOD) importer server 358 can receive content from one or more VOD sources outside the IPTV system 300, such as movie studios and programmers of non-live content. The VOD importer server 358 can transmit the VOD content to the AQT switch 352, and the AQT switch 352, in turn, can communicate the material to the CFT switch 330 via the private network 310. The VOD content can be stored at one or more servers, such as the VOD server 336.

When users issue requests for VOD content via the set-top box devices 316, 324, the requests can be transmitted over the access network 366 to the VOD server 336, via the CFT switch 330. Upon receiving such requests, the VOD server 336 can retrieve the requested VOD content and transmit the content to the set-top box devices 316, 324 across the access network 366, via the CFT switch 330. The set-top box devices 316, 324 can transmit the VOD content to the television monitors 318, 326. In an illustrative embodiment, video or audio portions of VOD content can be streamed to the set-top box devices 316, 324.

FIG. 3 further illustrates that the operations and management tier 308 can include an operations and management tier (OMT) switch 360 that conducts communication between the operations and management tier 308 and the public network 312. In the embodiment illustrated by FIG. 3, the OMT switch 360 is coupled to a TV2 server 362. Additionally, the OMT switch 360 can be coupled to an OSS/BSS server 364 and to a simple network management protocol monitor 386 that monitors network devices within or coupled to the IPTV system 300. In a particular embodiment, the OMT switch 360 can communicate with the AQT switch 352 via the public network 312.

The OSS/BSS server 364 may include a cluster of servers, such as one or more CPE data collection servers that are adapted to request and store operations systems data, such as performance data from the set-top box devices 316, 324. In an illustrative embodiment, the CPE data collection servers may be adapted to analyze performance data to identify a condition of a physical component of a network path associated with a set-top box device, to predict a condition of a physical component of a network path associated with a set-top box device, or any combination thereof.

In an illustrative embodiment, the live acquisition server 354 can transmit content to the AQT switch 352, and the AQT switch 352, in turn, can transmit the content to the OMT switch 360 via the public network 312. In this embodiment, the OMT switch 360 can transmit the content to the TV2 server 362 for display to users accessing the user interface at the TV2 server 362. For example, a user can access the TV2 server 362 using a personal computer 368 coupled to the public network 312.

It should be apparent to one of ordinary skill in the art from the foregoing media system embodiments that other suitable media systems for distributing broadcast media content as well as peer-to-peer exchange of can be applied to the present disclosure.

Figure 4:
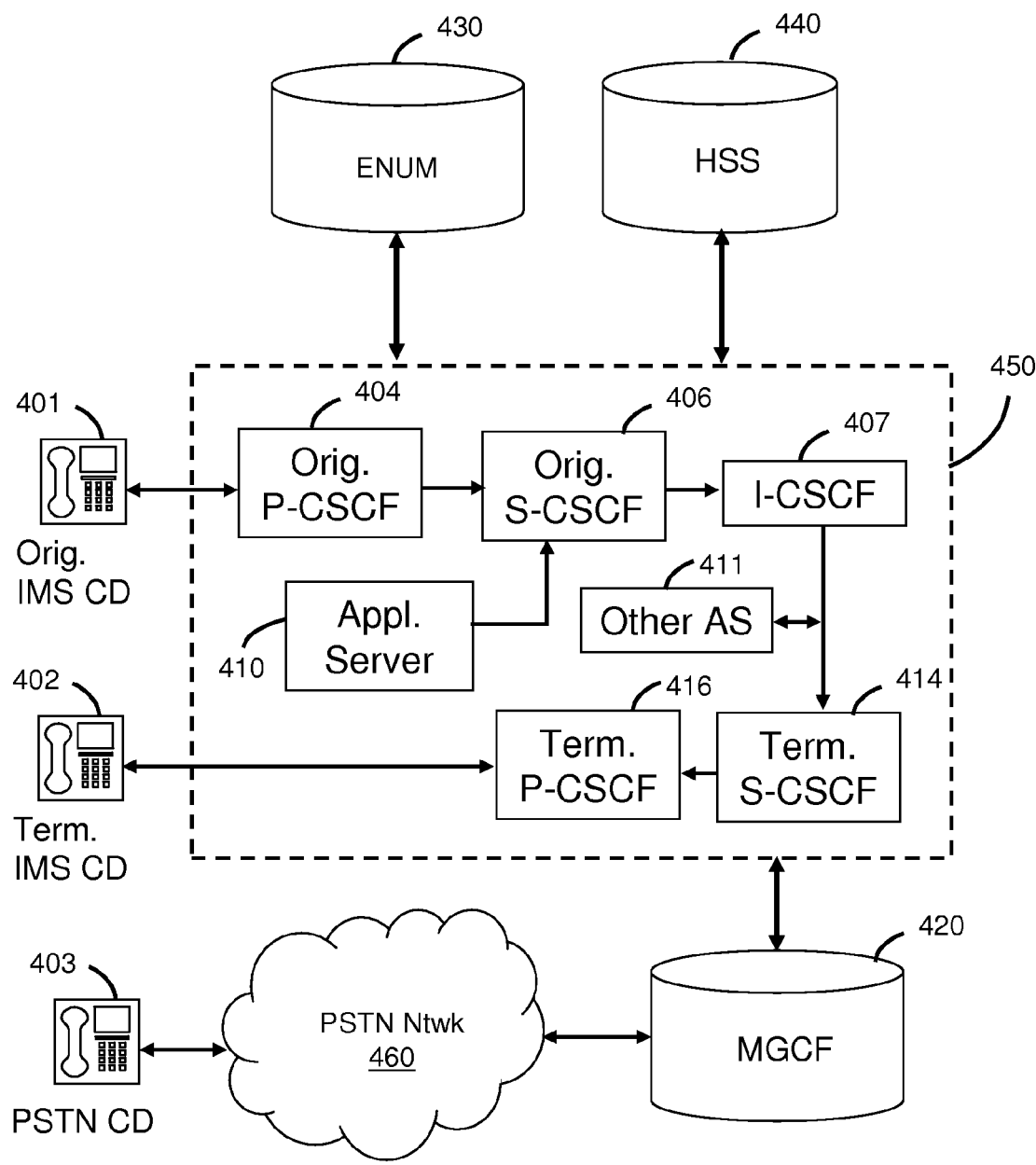

FIG. 4 depicts an exemplary embodiment of a communication system 400 employing a IP Multimedia Subsystem (IMS) network architecture. Communication system 400 can be overlaid or operably coupled with communication systems 100-300 as another representative embodiment of said communication systems.

The communication system 400 can comprise a Home Subscriber Server (HSS) 440, a tElephone NUmber Mapping (ENUM) server 430, and network elements of an IMS network 450. The IMS network 450 can be coupled to IMS compliant communication devices (CD) 401, 402 or a Public Switched Telephone Network (PSTN) CD 403 using a Media Gateway Control Function (MGCF) 420 that connects the call through a common PSTN network 460.

IMS CDs 401, 402 register with the IMS network 450 by contacting a Proxy Call Session Control Function (P-CSCF) which communicates with a corresponding Serving CSCF (S-CSCF) to register the CDs with an Authentication, Authorization and Accounting (AAA) support by the HSS 440. To accomplish a communication session between CDs, an originating IMS CD 401 can submit a SIP INVITE message to an originating P-CSCF 404 which communicates with a corresponding originating S-CSCF 406. The originating S-CSCF 406 can submit the SIP INVITE message to an application server (AS) such as reference 410 that can provide a variety of services to IMS subscribers. For example, the application server 410 can be used to perform originating treatment functions on the calling party number received by the originating S-CSCF 406 in the SIP INVITE message.

Originating treatment functions can include determining whether the calling party number has international calling services, and/or is requesting special telephony features (e.g., *72 forward calls, *73 cancel call forwarding, *67 for caller ID blocking, and so on). Additionally, the originating SCSCF 406 can submit queries to the ENUM system 430 to translate an E.164 telephone number to a SIP Uniform Resource Identifier (URI) if the targeted communication device is IMS compliant. If the targeted communication device is a PSTN device, the ENUM system 430 will respond with an unsuccessful address resolution and the S-CSCF 406 will forward the call to the MGCF 420 via a Breakout Gateway Control Function (not shown).

When the ENUM server 430 returns a SIP URI, the SIP URI is used by an Interrogating CSCF (I-CSCF) 407 to submit a query to the HSS 440 to identify a terminating S-CSCF 414 associated with a terminating IMS CD such as reference 402. Once identified, the I-CSCF 407 can submit the SIP INVITE to the terminating S-CSCF 414 which can call on an application server 411 similar to reference 410 to perform the originating treatment telephony functions described earlier. The terminating S-CSCF 414 can then identify a terminating P-CSCF 416 associated with the terminating CD 402. The P-CSCF 416 then signals the CD 402 to establish communications. The aforementioned process is symmetrical. Accordingly, the terms "originating" and "terminating" in FIG. 4 can be interchanged.

Figure 5:
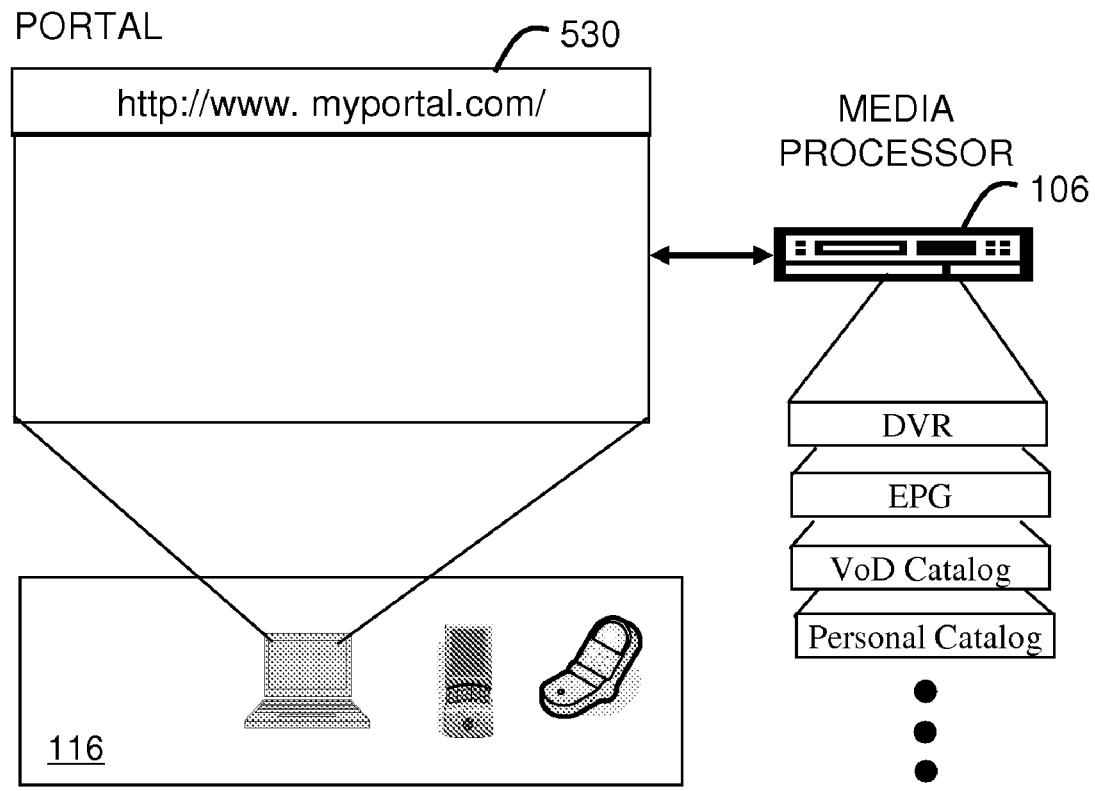
FIG. 5 depicts an exemplary embodiment of a portal interacting with at least one among the communication systems of FIGS. 1-4.

FIG. 5 depicts an exemplary embodiment of a portal 530. The portal 530 can be used for managing services of communication systems 100-400. The portal 530 can be accessed by a Uniform Resource Locator (URL) with a common Internet browser such as Microsoft's Internet Explorer using an Internet-capable communication device such as references 108, 116, or 210 of FIGS. 1-2. The portal 530 can be configured to access a media processor such as references 106, 204, 206, 316, and 324 of FIGS. 1-3 and services managed thereby such as a Digital Video Recorder (DVR), an Electronic Programming Guide (EPG), VOD catalog, a personal catalog stored in the STB (e.g., personal videos, pictures, audio recordings, etc.), and so on.

Figure 6:
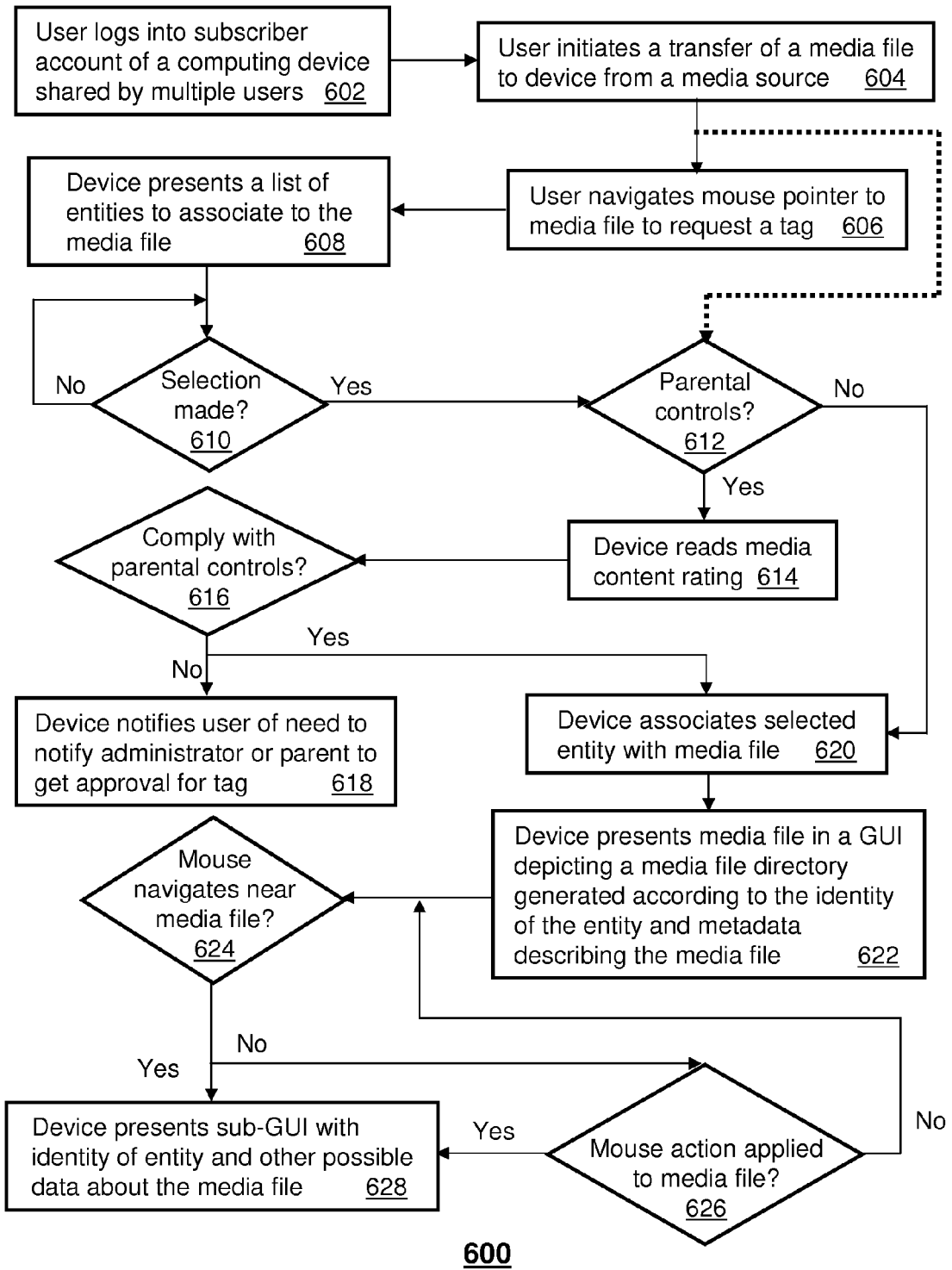
FIG. 6 depicts an exemplary method operating in portions of the communication systems of FIGS. 1-4.

FIG. 6 depicts an exemplary method 600 operating in portions of communication systems 100-400. Method 600 begins with step 602 in which a user logs into a computing device of the subscriber by common means. The computing device can be a computer, a media processor such as an STB, a communication device such as a fixed line phone or wireless device such as a cell phone or WiFi enabled communication device. The aforementioned computing devices can be represented by references 106, 107, 108, 116, 204, 206, 210, 212, 320, 316, 324, 368, 401, 402, or 403 in FIGS. 100-400. A log in process can represent turning on the computing device, and/or providing authentication data such as a user name and password, personal identification number, biometric information or other suitable authentication data.

In step 604 the user can initiate a transfer of a media file to the computing device from a common media source. The media source can represent any media device capable of storing and/or generating media files. Examples of a media source can be a portal or website such as reference 530 with a library of media files (music, movies, video games, still pictures, etc.); a DVR with one or more recorded media programs; a camcorder with recorded videos; a cell phone with ring tones, pictures, and videos; a media player such as an iPod™ with music and video files; an STB with a library of personal movies of the subscriber, and Video on Demand (VoD) movies purchased by the subscriber; office applications operating in a computer such as a Microsoft Word™ document, a Microsoft Excel™ spread sheet document, a Microsoft PowerPoint™ document, a Microsoft Publisher™ document, and so on. Any one of these media sources can serve as a source of a media file which can be transferred or copied to another device (in this instance a computing device). Since a computing device can also serve as a representative media source, step 604 can represent for example a transfer of a media file from a camcorder to an STB serving as a computing device or vice-versa; a transfer of an Excel spreadsheet in one computer to another, and so forth.

Figure 7:
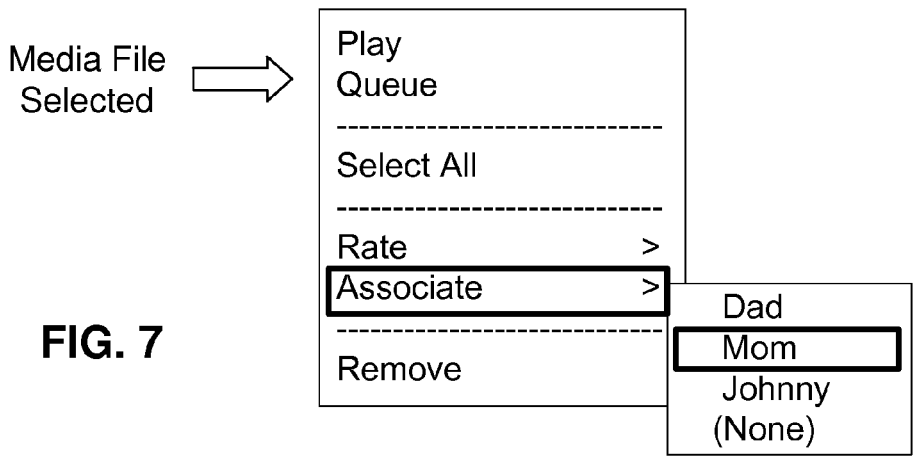
FIGS. 7-9 depict graphical user interface embodiments generated by the application of the method of FIG. 6.

At the computing device the user can use a navigation device such as a mouse pointer to point in step 606 to the media file received from the media source and perform an action recognized by the computing device. The action can be for example a right click of a mouse button which presents in step 608 a list of entities to associate to the media file. A representative illustration of step 608 is shown in FIG. 7. This illustration depicts a GUI with a selectable list of entities that can be associated or tagged to the media file. An entity can represent for example a user, a group of users, an alias, a consumption environment, or combinations thereof. In the illustration of FIG. 7 only individual users are shown. It will be appreciated that groups of users, aliases, and/or a consumption environment selection can also be shown.

Entities can be defined by the subscriber, or can be identified based on a knowledge of all users who utilized the resources of the computing device. In one illustrative embodiment a media file can be tagged with an entity representing a single user (Mom). In another illustrative embodiment the media file can tagged with an entity representing a group of users (Mom, Dad, and children). In another illustrative embodiment a media file can be tagged with a consumption environment. A consumption environment can represent for instance a tag for parental controls. For example a media file can be tagged with a user restriction based on a media content rating included in metadata that describes the media content in the media file (e.g., only adults users can tag rated R media files). In another illustrative embodiment parental controls can be controlled by administrative rights established on the computing device. For example, a parent can provide a user a restricted subscriber account in the computing device which requires the user to seek permission from the parent to tag any media file requested from the parent's library or accepted by the user from any media source.

Thus when an entity selection is detected in step 610, the computing device can be directed in step 612 to check for parental controls. If no parental controls exist, the computing device proceeds to step 620 where it associates the selected entity with the media file. The computing device can accomplish this step by creating metadata that defines the identity of the entity selected, which is then incorporated or combined with metadata that describes the media file. If on the other hand parental controls are active, the computing device can proceed to step 614 where it reads a media content rating from metadata that describes the media file.

The descriptive metadata can include among other things an identification of an author of the media content (producers, actors, directors, etc.), a title for the media content, a hierarchical structure of the media content (e.g., a description of singles in an album, movie scene selections in a movie, game selections, etc.), an indication of a presentation length of the media content, a genre of the media content (action movie, heavy metal music, etc.), a publication date of the media content, and a rating of the media content (e.g., G, PG, PG-13, R, or other suitable rating formats).

With the media rating, the computing device can determine in step 616 whether the tagging request complies with the parental controls. For example, a parent can establish settings in the computing device shared between the parent and children so that all G-rated media can be tagged by anyone, while R-rated media can only be tagged by the parents. If the computing device detects in step 616 that the parental controls comply with the rating of the media file which the user seeks to tag, the computing device proceeds to step 620 and accomplishes the tagging process as previously described. If parental permission is required, the computing device proceeds to step 618 where it notifies the user of the restriction.

Figure 8:
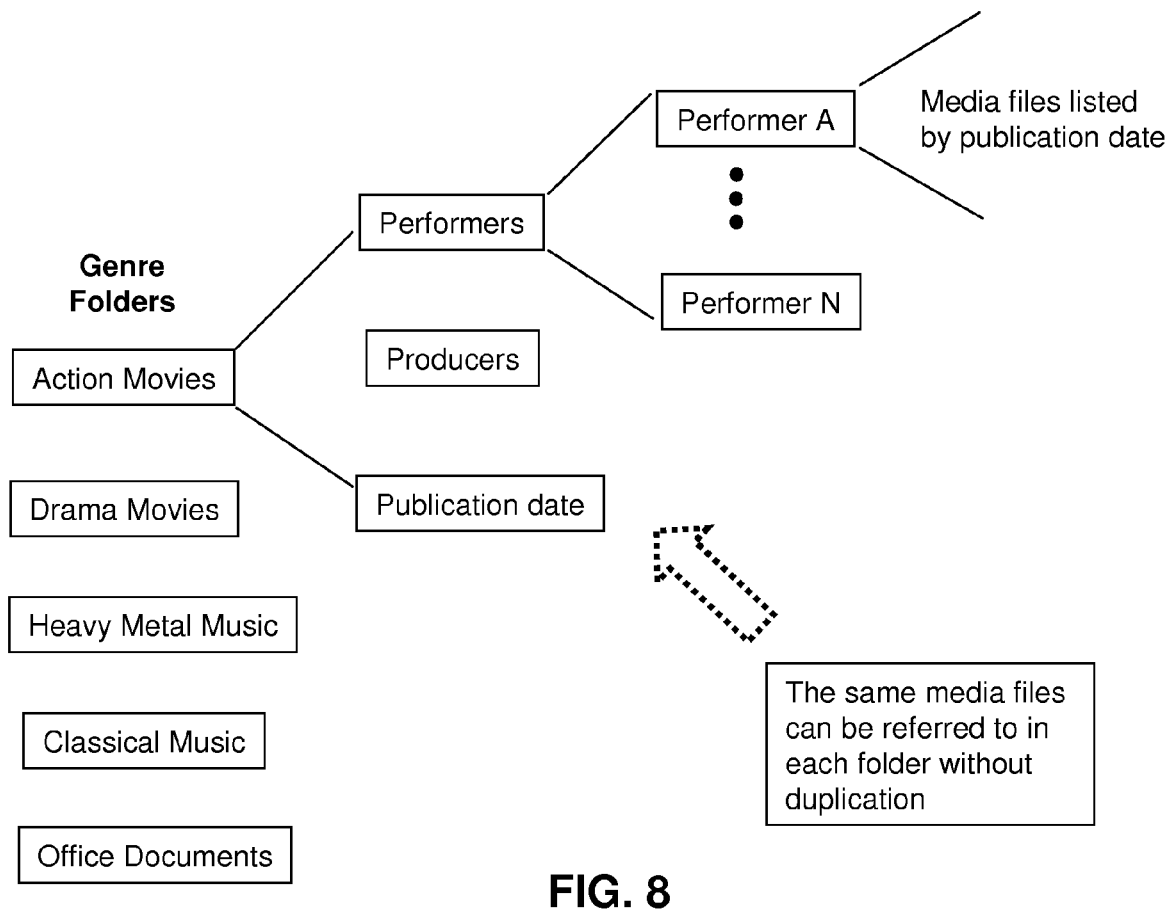

Once the media file has been tagged with an identity of an entity, the computing device can in step 622 generate a media storage system that depicts the media file in a GUI such as shown in FIG. 8. The media storage system can represent a media file directory structure generated according to the metadata that identifies the entity and the metadata that describes the media content in the media file. For example, in the case where the entity is an individual user, the media storage system can be established exclusively for the user and can be depicted by sets of directory folders. For example once set of folders can be organized by movie genre (action, drama, etc.) and publication date; another set of folders can be organized by music genre (heavy metal, classical, etc.); another set of folder can be organized by performers (actors, singers, etc.), and so on.

Figure 9:
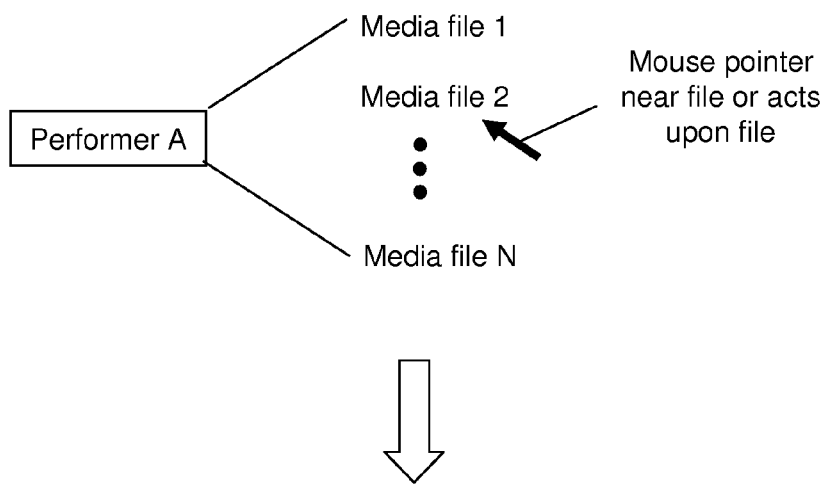

A media file directory structure can broadly represent a file system of any suitable form that can perform the tasks described herein. The file system can be an integral part of an operating system that manages resources of the computing device. The file system can represent for instance conventional file systems such as a file allocation table (FAT) or a network file system (NFS) managed by an operating system (e.g., Microsoft Windows™) adapted to method 600 as illustrated by FIGS. 7-9.

The media storage system can be a virtual directory structure created according to the identity of the entity and the metadata that describes the media content. Accordingly, the directory structure created for one user may differ from another user although the same media file may be referenced by both directory structures without duplication. Similarly, multiple folders can point to the same media file to provide the user flexibility in finding the media file in different ways. For example, media files organized by performers in FIG. 8 can show up also in a folder organized by producers and a folder of media files organized by publication dates. Duplication of a media file may exist only in situations where a user edits or modifies the media file by removing or adding content to it. When this happens the media file can become exclusive to the user and made available to other users depending on whether it is tagged for general availability.

The computing device can be further directed in step 624 to detect in step 626 a presence of a mouse pointer navigating near the tagged media file or acting upon the media file (e.g., selecting the media file and/or right clicking a mouse button). When either of these activities is detected, the computing device can present in step 628 a sub-GUI that shows the identity of the entity (or entities) that have tagged this media file, and useful information about the media file such as its title, presentation length, authorship, etc. An illustrative embodiment of this sub-GUI is shown in FIG. 9. In this illustration, the placing a mouse pointer creates a sub-GUI window that provides a description of the media content in the media file, other users tagged to the media file, and with a drop-down menu to act on the media file (e.g., play the media content).

Upon reviewing the aforementioned embodiments, it would be evident to an artisan with ordinary skill in the art that said embodiments can be modified, reduced, or enhanced without departing from the scope and spirit of the claims described below. For example, method 600 can be adapted to perform automatic media file tagging. For instance, the computing device can be directed in step 604 to skip to step 612 as shown in FIG. 6 on the assumption that it already knows who the user is when the user logged in step 602. In step 620 the user can be associated with the media file based on this knowledge. In step 622, a user can also define preferences for the media storage system. For example, the user can indicate that video media files are to be organized both by performers and producers. Such settings can be provided as input to an operating system of the computing device or by other suitable means. In yet another illustrative embodiment, the method 600 can be adapted so that partial tags can be used. For example, a user can tag a single music item in a music album rather than tagging the album in its entirety.

Other suitable modifications can be applied to the present disclosure without departing from the scope of the claims below. Accordingly, the reader is directed to the claims section for a fuller understanding of the breadth and scope of the present disclosure.

Figure 10:
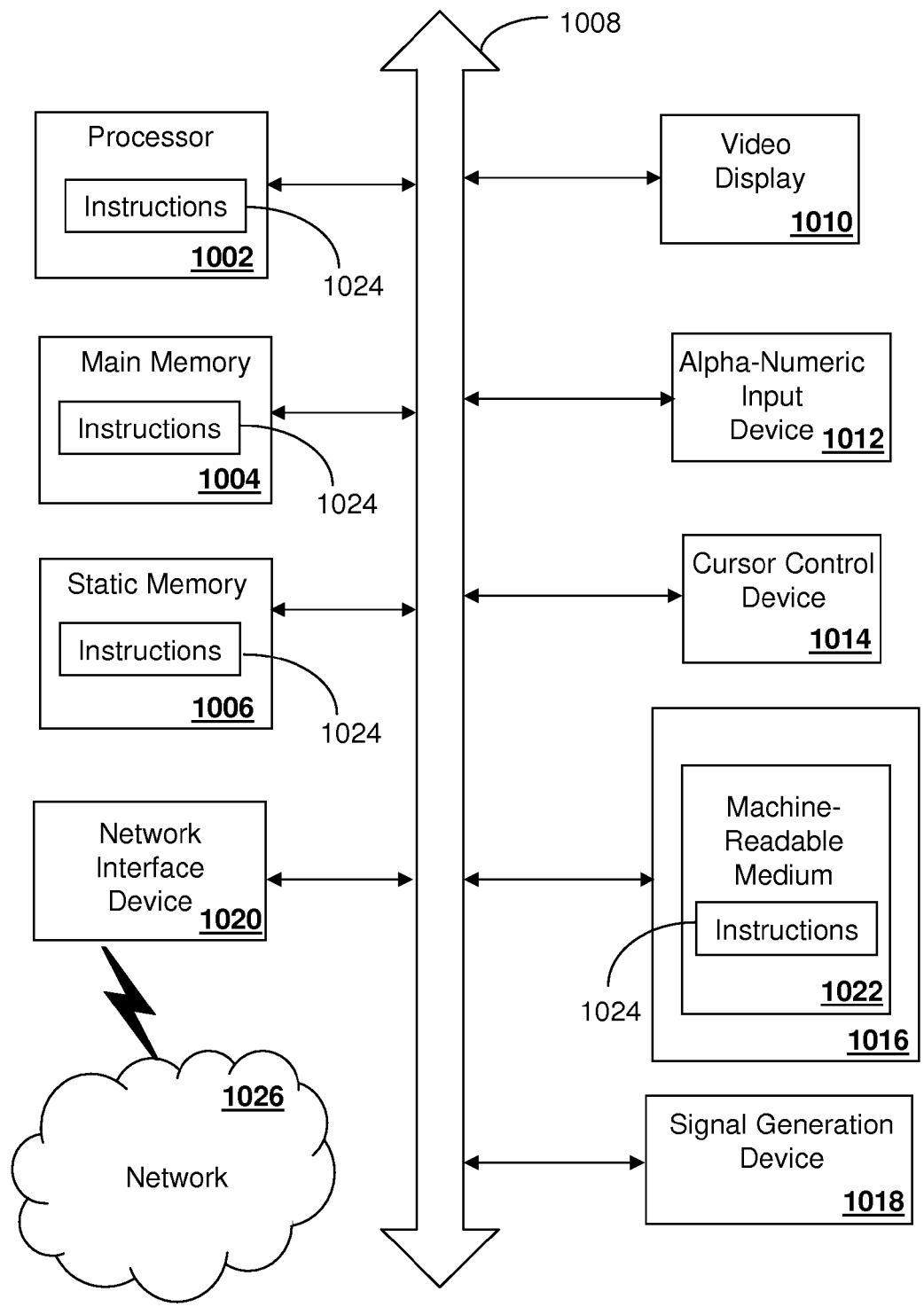
FIG. 10 is a diagrammatic representation of a machine in the form of a computer system within which a set of instructions, when executed, may cause the machine to perform any one or more of the methodologies discussed herein.

FIG. 10 depicts an exemplary diagrammatic representation of a machine in the form of a computer system 1000 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 1000 may include a processor 1002 (e.g., a central processing unit (CPU), a graphics processing unit (GPU, or both), a main memory 1004 and a static memory 1006, which communicate with each other via a bus 1008. The computer system 1000 may further include a video display unit 1010 (e.g., a liquid crystal display (LCD), a flat panel, a solid state display, or a cathode ray tube (CRT)). The computer system 1000 may include an input device 1012 (e.g., a keyboard), a cursor control device 1014 (e.g., a mouse), a disk drive unit 1016, a signal generation device 1018 (e.g., a speaker or remote control) and a network interface device 1020.

The disk drive unit 1016 may include a machine-readable medium 1022 on which is stored one or more sets of instructions (e.g., software 1024) embodying any one or more of the methodologies or functions described herein, including those methods illustrated above. The instructions 1024 may also reside, completely or at least partially, within the main memory 1004, the static memory 1006, and/or within the processor 1002 during execution thereof by the computer system 1000. The main memory 1004 and the processor 1002 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 1024, or that which receives and executes instructions 1024 from a propagated signal so that a device connected to a network environment 1026 can send or receive voice, video or data, and to communicate over the network 1026 using the instructions 1024. The instructions 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and carrier wave signals such as a signal embodying computer instructions in a transmission medium; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions to:
   receive from a user a request to tag at least a portion of a media file with an identity of the user;
   create metadata corresponding to the identity of the user;
   incorporate in the media file the metadata that identifies the user with metadata that describes media content in the media file; and
   present a graphical user interface depicting a media file directory structure generated according to the metadata that identifies the user and the metadata that describes media content in the media file, wherein the media file directory structure presents at least a portion of the media file, and wherein the portion of the media file is shared with another media file directory structure without resulting in a duplication of the media file.

2. The non-transitory computer-readable storage medium of claim 1, wherein the media file directory structure comprises a file system managed by an operating system, and wherein the media content comprises one among audio content, moving image content, still image content, and textual content.

3. The non-transitory computer-readable storage medium of claim 1, comprising computer instructions to create the metadata corresponding to the identity of the user responsive to a navigation device action initiated by the user.

4. The non-transitory computer-readable storage medium of claim 1, comprising computer instructions to:
present a list of users to associate with the media file responsive to detecting a first navigation device action; and
create the metadata corresponding to the identity of the user responsive to a second navigation device action that selects the user from the list of users.

5. The non-transitory computer-readable storage medium of claim 1, comprising computer instructions to:
enable the user to gain access to a subscriber account of the user responsive to receiving authentication data from the user;
identify the user according to the authentication data;
receive the media file while the user has access to the subscriber account of the user; and
tag the media file with the identity of the user responsive to receiving the media file.

6. The non-transitory computer-readable storage medium of claim 1, wherein the description of the media content comprises at least one among an identification of an author of the media content, a title for the media content, a hierarchical structure of the media content, an indication of a presentation length of the media content, a genre of the media content, a publication date of the media content, and a rating of the media content.

7. The non-transitory computer-readable storage medium of claim 1, comprising computer instructions to present a sub-graphical user interface that describes at least the identity of the user responsive to one of sensing a pointer of a navigation device in a vicinity of a presentation of the media file in the graphical user interface depicting the media file directory or an action taken by the navigation device in relation to the media file.

8. The non-transitory computer-readable storage medium of claim 1, comprising computer instructions to tag the media file with the identity of the user responsive to the metadata that describes the media content complying with one or more established parental controls.

9. The non-transitory computer-readable storage medium of claim 8, wherein the parental controls limit tagging of the media file according to a rating of the media content supplied in the metadata that describes the media content.

10. The non-transitory computer-readable storage medium of claim 1, wherein the computer-readable storage medium operates in one among a computer, a media processor, a fixed line communication device, and a wireless communication device.

11. The non-transitory computer-readable storage medium of claim 10, wherein the media processor comprises at least one among a set-top box, a digital video recorder, and a media player.

12. The non-transitory computer-readable storage medium of claim 10, wherein the media processor operates in at least one among an Internet Protocol Television communication system, a cable TV communication system, a satellite TV communication system, a Public Switched Telephone Network, a Voice over IP (VoIP) communication system, and a IP Multimedia Subsystem combining the PSTN and VoIP communication systems.

13. A device, comprising a memory coupled to a controller, the controller operable to:
receive from a user a request to tag at least a portion of a media file with an identity of the user;
create metadata corresponding to an identity of the user;
incorporate in the media file the metadata that identifies the user with metadata that describes media content in the media file; and
present a graphical user interface depicting a media file directory structure generated according to the metadata that identifies the user entity and the metadata that describes media content in the media file, wherein the media file directory structure presents at least a portion of the media file, and wherein the portion of the media file is shared with another media file directory structure without resulting in a duplication of the media file.

14. The device of claim 13, wherein the device comprises one among a computer, a media processor, a fixed line communication device, and a wireless communication device.

15. The device of claim 14, wherein the media processor comprises at least one among a set-top box, a digital video recorder, and a media player.

16. The device of claim 14, wherein the media processor operates in at least one among an Internet Protocol Television communication system, a cable TV communication system, a satellite TV communication system, a Public Switched Telephone Network, a Voice over IP (VoIP) communication system, and a IP Multimedia Subsystem combining the PSTN and VoIP communication systems.

17. The device of claim 13, wherein the controller is adapted to present a sub-graphical user interface that describes at least the identity of the user responsive to one among sensing a pointer of a navigation device in a vicinity of a presentation of the media file in the graphical user interface depicting the media file directory, or an action taken by the navigation device in relation to the media file.

18. The device of claim 13, comprising computer instructions for tagging the media file with the identity of the user responsive to the metadata that describes the media content complying with one or more established parental controls, wherein the parental controls limit tagging of the media file according to a rating of the media content supplied in the metadata that describes the media content.

19. A method, comprising:
receiving at a computing device a request from a user to tag at least a portion of a media file with an identity of the user;
creating using the computing device, metadata corresponding to the identity of the user;
incorporating in the media file using the computing device, the metadata corresponding to the identity of the user with metadata that describes media content in the media file; and
presenting a graphical user interface at a user interface of the computing device that depicts a media file directory structure generated according to the metadata corresponding to the identity of the user and the metadata that describes media content in the media file, wherein the media file directory structure presents at least a portion of the media file, and wherein the portion of the media file is shared with another media file directory structure without resulting in a duplication of the media file.

20. The method of claim 19, comprising:
identifying using the computing device, one or more user preferences to organize a presentation of the media file;
presenting a sub-graphical user interface that describes at least the identity of the user responsive to one among sensing a pointer of a navigation device in a vicinity of a presentation of the media file in the graphical user interface depicting the media file directory, or an action taken by the navigation device in relation to the media file,
wherein the method operates in one among a computer, a media processor, a fixed line communication device, and a wireless communication device, wherein the media processor comprises at least one among a set-top box, a digital video recorder, and a media player, wherein the media processor operates in at least one among an Internet Protocol Television communication system, a cable TV communication system, a satellite TV communication system, a Public Switched Telephone Network, a Voice over IP (VoIP) communication system, and a IP Multimedia Subsystem combining the PSTN and VoIP communication systems, and wherein the method comprises identifying one or more user preferences to organize a presentation of the media file in the media storage system GUI.

* * * * *